United States Patent

Tachihara

[11] 4,345,822
[45] Aug. 24, 1982

[54] TELEPHOTO ZOOM LENS

[75] Inventor: Satoru Tachihara, Wako, Japan

[73] Assignee: Asahi Kogaku Kogyo Kabushiki Kaisha, Tokyo, Japan

[21] Appl. No.: 193,494

[22] Filed: Oct. 3, 1980

[30] Foreign Application Priority Data

Oct. 12, 1979 [JP] Japan ............... 54-131527

[51] Int. Cl.³ .......................... G02B 15/16
[52] U.S. Cl. ................................ 350/427
[58] Field of Search .................... 350/427

[56] References Cited

U.S. PATENT DOCUMENTS

| Re. 28,591 | 10/1975 | Nakamura | 350/427 |
| 3,615,125 | 10/1971 | Higuchi et al. | 350/427 |
| 4,094,586 | 6/1978 | Sato et al. | 350/427 |
| 4,110,068 | 8/1978 | Ikamori | 350/427 |

FOREIGN PATENT DOCUMENTS 2817633  11/1978  Fed. Rep. of Germany ...... 350/427

Primary Examiner—John K. Corbin
Assistant Examiner—Scott J. Sugarman
Attorney, Agent, or Firm—Sughrue, Mion, Zinn, Macpeak & Seas

[57] ABSTRACT

A compact zoom lens for a 35 mm SLR camera having a focal length at the telephoto end extending into a super telephoto region and having a zoom ratio greater than four. The zoom lens includes, in order from the object side, a first lens group having a positive refractive power, a second lens group having a negative refractive power, a third lens group having a positive refractive power, and a fourth lens group having a negative refractive power. The second lens group is movable along the optical axis to vary the focal length and the third lens group is movable along the optical axis to maintain the image position constant. The fourth lens group is composed, in order, of a negative lens, a positive lens, at least one positive lens and at least one negative lens.

2 Claims, 8 Drawing Figures

TELEPHOTO ZOOM LENS

BACKGROUND OF THE INVENTION

The present invention relates to a compact zoom lens, particularly adapted for use with a 35 mm SLR camera, in which the focal length at the telephoto end extends into a so-called super telephoto region, the zoom ratio is more than four while at the same time the telephoto ratio (the ratio of the overall length to the maximum focal length) is extremely small.

In order to design a zoom lens in a compact size with a zoom ratio more than four and a maximum focal length which falls in the super telephoto range, it is very important to select the basic type of the zoom lens. For example, a so-called afocal type zoom lens in which a ray of light emerging from a third lens group (compensator) is made afocal is disclosed in Japanese Patent Publication 49/24295. As described in that publication, a second lens group (variator), the magnification of which is less than a unit magnification, is used. In specific examples thereof, the zoom ratio is about 3.3. If the zoom ratio were increased in that type of zoom lens, the total length would have to be increased or the refractive powers of the various lens groups would have to be made much stronger. Accordingly, it is difficult to compensate for various aberrations over the full range of focal length.

SUMMARY OF THE INVENTION

In accordance with the invention, a telephoto type fixed focus lens is introduced into a zoom lens whereby, although the zoom ratio is high, the structure of a compact super telephoto zoom lens having a high performance is attained.

According to the present invention, a compact super telephoto zoom lens having an extremely good performance, includes, in order from the object side, a first lens group having a positive refractive power, a second lens group having a negative refractive power, a third lens group having a positive refractive power and a fourth lens group having a negative refractive power. The second lens group is movable along the optical axis to thereby vary the focal length of the zoom lens system while at the same time the third lens group is movable along the optical axis to thereby maintain the image position constant. The fourth lens group is composed in order of a negative lens, a positive lens, at least one positive lens and at least one negative lens. The zoom lens satisfies the following conditions:

$$0.55 f_W \leq |f_2| \leq 0.75 f_W \text{ with } f_2 < 0, \quad (1)$$

$$2.0 \leq f_2/f_{123} \leq 3.0, \quad (2)$$

$$1.70 \leq N_L, \text{ and} \quad (3)$$

$$3/4 \leq R_L \leq f_4, R_L < 0, \quad (4)$$

where $f_W$ is the overall minimum focal length, $f_2$ is the focal length of the second lens group, $f_0$ is the overall focal length, $f_{123}$ is the resultant focal length of the first, second and third lens groups when the overall focal length is $f_0$, $f_4$ is the focal length of the fourth lens group, $N_L$ is the refractive index of the first negative lens of the fourth lens group, and $R_L$ is the radius of curvature of the object side lens surface of the first negative lens of the fourth lens group.

DESCRIPTION OF THE PREFERRED EMBODIMENTS

Figure 1:
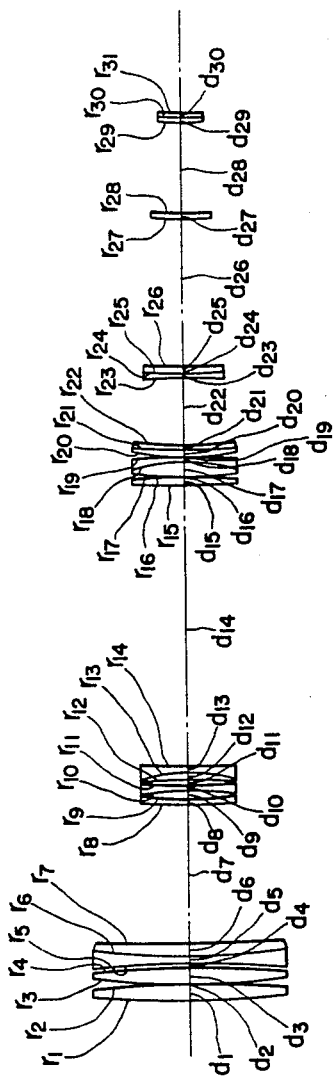
FIGS. 1 and 2 are cross-sectional views of lenses corresponding to Examples 1 and 2 described hereinbelow.
Figure 2:
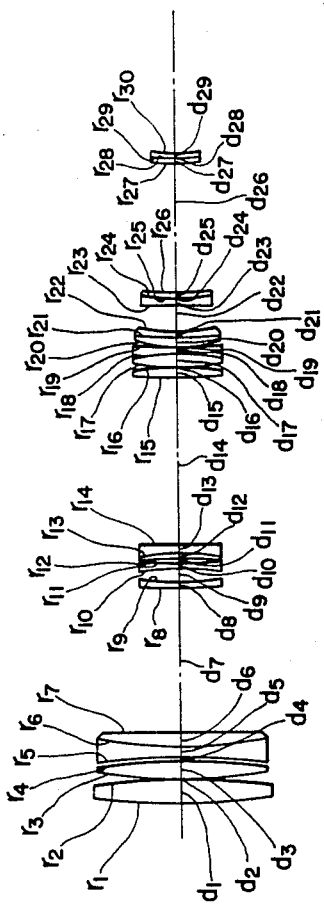
Figure 3A:
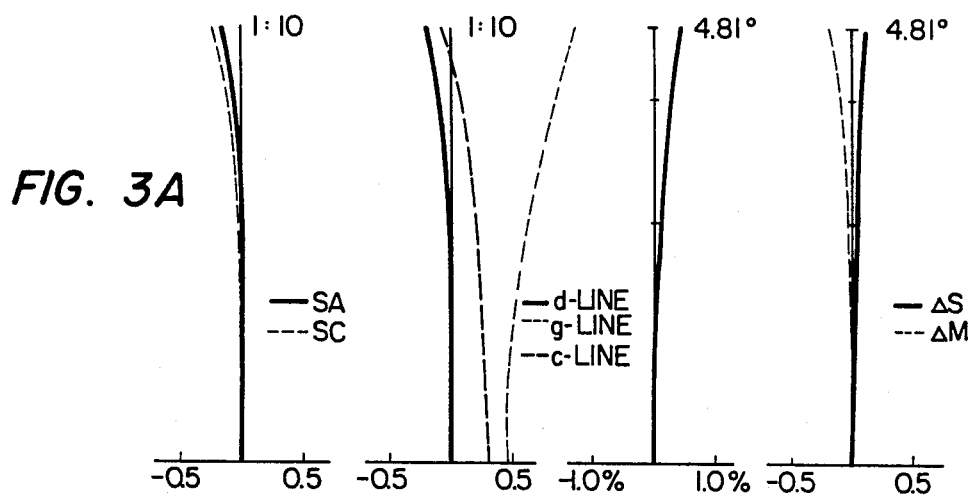
FIGS. 3 and 4 are graphs showing various aberration curves for the Examples 1 and 2, respectively, where a is the minimum focal length, b the median focal length and c the maximum focal length.
Figure 3B:
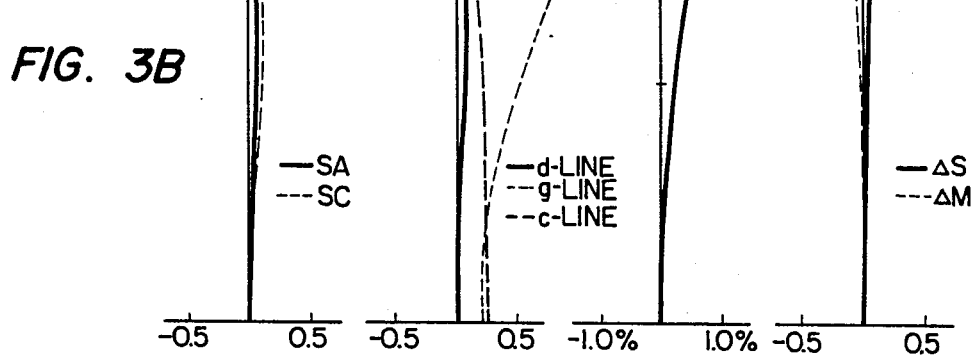
Figure 3C:
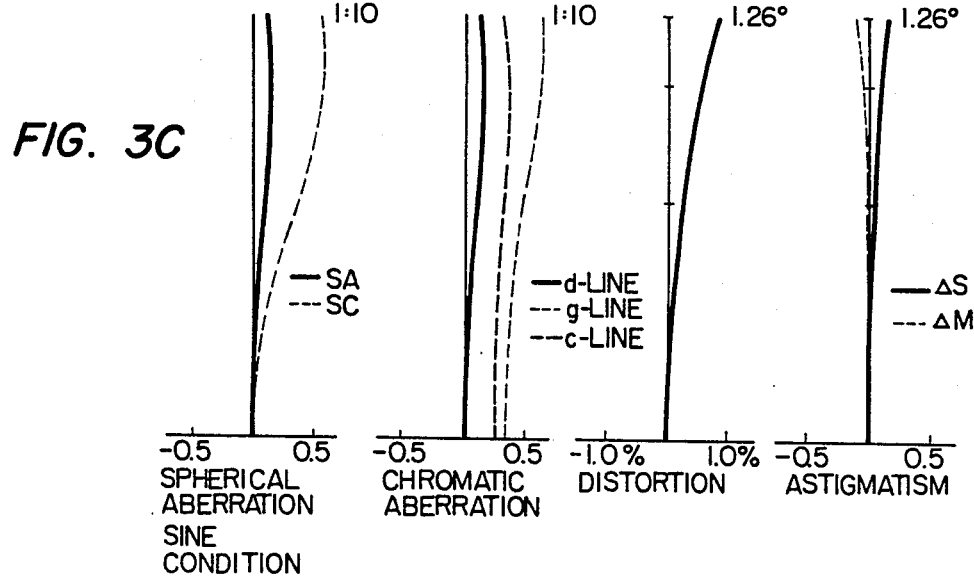
Figure 4A:
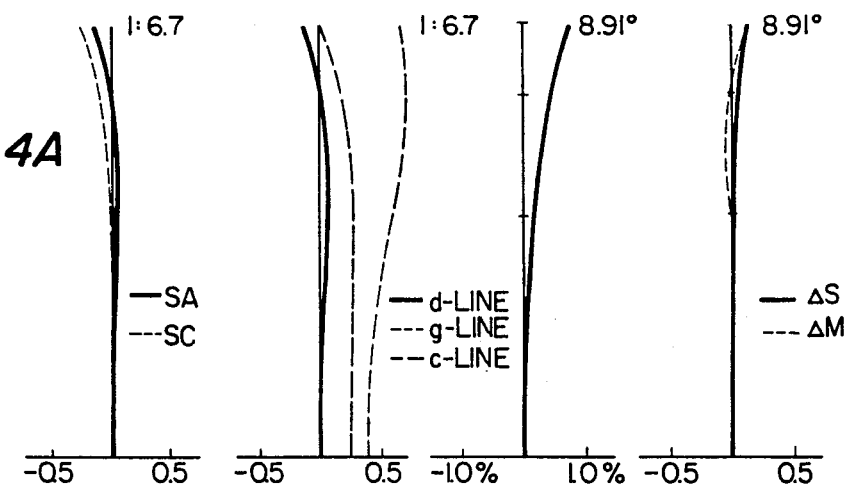
Figure 4B:
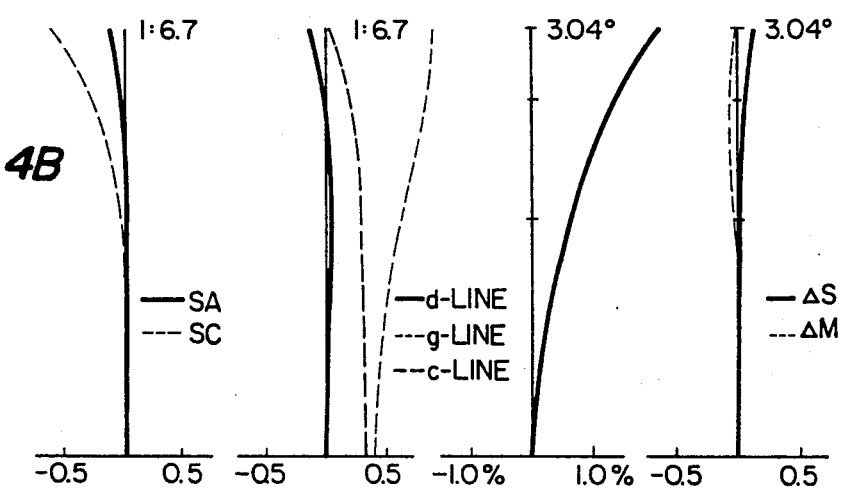
Figure 4C:
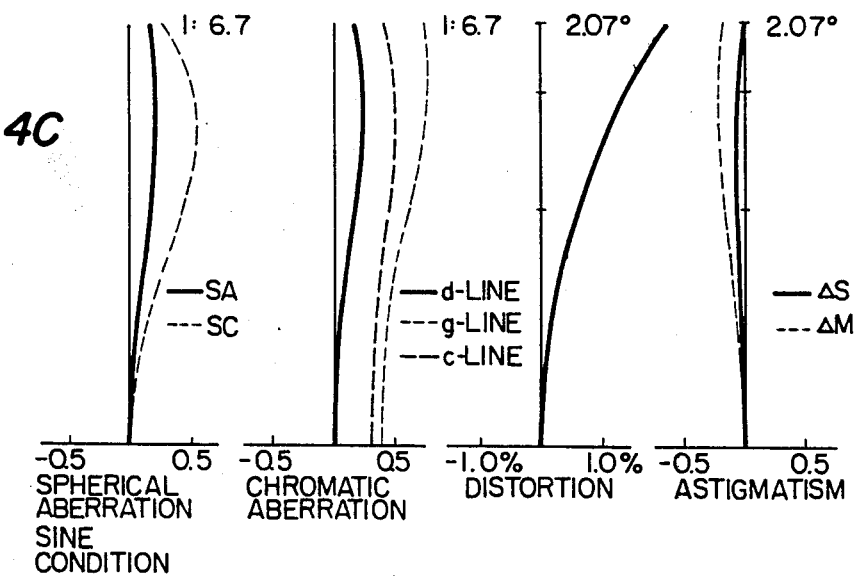

The respective conditions enumerated above will now be explained.

Condition (1) is required to shorten the overall length and to minimize various aberrations and variations thereof. That is, since the second lens group serves as a variator for the overall lens system and the greater the refractive power the shorter the movement needed to obtain the same variator ratio, it is easy to shorten the overall length. However, the stronger the refractive power the more intense will be the various aberrations generated. In particular, since the second lens group is movable, aberration variations are liable to be caused over the entire focal length range to balance the above-described tendencies. Below the lower limit, although the zoom lens can then be made much more compact, in case the zoom ratio is extended to more than four, as is desired, it is difficult to well compensate the various aberrations over the entire focal length range. Inversely, above the upper limit, such is desirable for aberration balance but makes the lens system difficult to be made compact.

Condition (2) is also related to the compactness of the overall lens system and is a remarkable feature of the present invention. For a fixed focus telephoto lens, a telephoto type lens is substantially divided into a front lens group having a positive refractive and a rear lens group having a negative refractive power. It is well known that the stronger the refractive power of the front lens group, that is, the shorter the focal length of the front lens group in comparison with the overall focal length, the more compact the lens can be made.

This theory is applied to the zoom lens of the present invention. A negative refractive power is imparted to the fourth lens group which forms a "master section". The composite section composed of the first to third lens groups is regarded as the front lens group of the telephoto type lens and a strong positive power is imparted thereto so that the zoom lens can be miniaturized.

When the upper limit of condition (2) is exceeded, the refractive power of the resultant lens group composed of the first, second and third lens groups, which is regarded as the front lens group, is three times or more the refractive power of the overall lens system. As a result, although the zoom lens system may be compact, the refractive power thereof is too strong. Therefore, compensation for spherical aberration and astigmatism is insufficient. To compensate for these aberrations, the refractive power of the fourth lens group must be increased. This causes high order aberrations to be generated which is unsuitable for aberration balance. Inversely, when the lower limit is exceeded, it is easy to correct the aberrations but miniaturization of the zoom lens system cannot be attained. Therefore, if the refractive power distribution of respective lens groups is determined so as to satisfy condition (2), the third lens group can be reciprocatingly moved convexly toward the object so that the variable space between the second and third lens groups is also utilized. This is effective for miniaturization.

Conditions (3) and (4) concern the first negative lens of the fourth lens group. Since the first to third lens groups, which are so constructed as to satisfy conditions (1) and (2), have a strong positive refractive power in the resultant lens group, spherical aberration and astigmatism are not sufficiently corrected for. In order to compensate for these aberrations, a negative lens which has a relatively strong refractive power is required as the first lens of the fourth lens group. When optical glass material which does not satisfy condition (3) is used for the above-described negative lens, the radii of curvature of both lens surfaces thereof must be decreased in terms of absolute values so that high order excessive compensation aberrations are generated and it is difficult to correct the aberrations with a good balance. Condition (4) concerns the radius $R_L$ of curvature of the surface of the above described negative lens on the object side. When the lower limit is exceeded, $R_L$ is too small, an excessive load is imposed on the image side lens surface so that the various aberrations cannot be well corrected. Inversely, when the upper limit is exceeded, $R_L$ is too great so that excessively corrected aberrations are generated on the image side lens surface thereby deteriorating the zoom lens system performance.

The above-specified conditions are satisfied with the lens system of the invention to provide a very compact telephoto zoom lens having a relatively large aperture and good overall performance. It is, however, preferable to further satisfy the following conditions to provide greater aberration compensation for the zoom lens system. Namely, a compact super telephoto zoom lens having an extremely good performance in accordance with this embodiment of the invention includes, in order from the object side, a first lens group having a positive refractive power and which is composed of two biconcave lenses at least one of which has an Abbe number of 60 or more and a cemented lens made up of a negative lens and a positive lens, a second lens group having a negative refractive power and composed of at least one negative lens and a cemented lens made up of a positive lens and a negative lens with the cemented surface being concave toward the object, a third lens group having a positive refractive power and composed of a single positive lens and two cemented lenses each being made up of a positive lens and a negative lens, and a fourth lens group having a negative refractive power and composed of a negative lens, a positive lens, at least one positive lens and at least one negative lens in that order wherein said first lens group is movable for focussing, the second lens group is movable along the optical axis to thereby vary the focal length and at the same time the third lens group is movable along the optical axis to thereby maintain the image position constant.

Besides the zoom lens system satisfying the above described conditions (1) to (4), the zoom lens system of this embodiment further satisfies the following conditions:

$$\nu_{2N} - \nu_{2P} \geq 25, \quad \text{(a)}$$

$$\nu_{3P} - \nu_{3N} \geq 15, \text{ and} \quad \text{(b)}$$

$$|\nu_{2P} - \nu_{3N}| \leq 10, \quad \text{(c)}$$

where $\nu_{iP}$ is the Abbe number of any positive lens of the i-th lens group and $\nu_{iN}$ is the Abbe number of any negative lens of the i-th lens group.

It is desirable that, since the first lens group is movable for focussing, the aberration coefficients be reduced to as small values as possible to reduce the variation of aberration caused by the variation of the object distance. The reduction of the aberration coefficients of the first lens group is also effective for reducing the load imposed on the lens groups after the second lens group for aberration compensation. Since the first lens group is composed of two convex lenses and a cemented lens made up of a negative lens and a positive lens, the above noted effect is obtained. That is, the radius of curvature of each lens surface can be increased by distributing the refractive power to the two biconcave lenses so that the aberration coefficients of the entire first lens group can be reduced.

For a super telephoto zoom lens system as in the present invention, aberration compensation for the chromatic aberration affects the performance of the lens system, particularly at the telephoto end. Moreover, since the aberrations generated in the first lens group are amplified after the second lens group, it is important to reduce the chromatic aberration generated in the first lens group to the minimum possible value as is the case for the other aberrations. For this reason, if the Abbe number of at least one lens of the two biconvex lenses included in the first lens group is not 60 or more, it is impossible to sufficiently compensate for the chromatic aberration. Furthermore, in order to more completely correct the chromatic aberration, it is desired to use for at least one of the above-described biconvex lenses optical material which has low dispersion characteristics.

Condition (a) is required to obtain an achromatic effect with the second lens group. Deviating from this condition, the radius of curvature of the cemented lens surface must be decreased in absolute value for the achromatic effect. Since the end thickness of the positive lenses must be suitably maintained, the thickness at the optical axis is increased, which is unsuitable for miniaturization. Also, since high order aberrations are generated upon increasing the curvature, it is difficult to maintain the aberrations in balance over the zoom range.

The second lens group may be composed of a single negative lens and a single cemented lens made up of a positive lens and a negative lens with the cemented concave surface thereof directed to the object. However, in order to compensate for the aberrations more completely and in order to maintain the aberration balance more completely over a zoom range extending to a zoom ratio of four, it is preferable to divide the single negative lens into two negative lenses to thereby separate the aberration compensation load imposed thereon.

Condition (b) is required to attain the achromatic effect at the third lens group. Deviating from that condition, the radius of curvature of the cemented lens surface must be decreased in absolute value to achieve the achromatic effect. Therefore, since high order aberrations are generated, it is difficult to balance the aberrations, particularly at the medium focal length.

Condition (c) is required to highly compensate for the chromatic aberration in the overall lens system in cooperation with conditions (a) and (b).

Specific Examples of lens systems constructed according to the present invention will be described in which f is the focal length, R is the radius of curvature, D is the thickness on the optical axis or the spacing between lenses, N is the refractive index at the d-line, and is the Abbe number of the respective lens.

EXAMPLE 1

| | f = 254.0~980.0 | | $F_{NO}$ = 10.0 | | |
|---|---|---|---|---|---|
| | R | D | | | |
| 1 | 500.000 | 7.09 | $N_1$ 1.49700 | $\nu_1$ | 81.3 |
| 2 | −646.382 | 0.22 | | | |
| 3 | 322.505 | 8.09 | $N_2$ 1.49700 | $\nu_2$ | 81.3 |
| 4 | −696.315 | 1.75 | | | |
| 5 | −680.500 | 4.28 | $N_3$ 1.74400 | $\nu_3$ | 44.7 |
| 6 | 360.000 | 5.81 | $N_4$ 1.56873 | $\nu_4$ | 63.2 |
| 7 | 1966.422 | Variable | | | |
| 8 | 605.547 | 2.65 | $N_5$ 1.49700 | $\nu_5$ | 81.3 |
| 9 | 174.750 | 3.55 | | | |
| 10 | −189.000 | 2.80 | $N_6$ 1.61800 | $\nu_6$ | 63.4 |
| 11 | ∞ | 2.39 | | | |
| 12 | −237.849 | 3.68 | $N_7$ 1.74077 | $\nu_7$ | 27.8 |
| 13 | −99.34 | 3.00 | $N_8$ 1.51821 | $\nu_8$ | 65.0 |
| 14 | 957.523 | Variable | | | |
| 15 | 816.500 | 4.91 | $N_9$ 1.49700 | $\nu_9$ | 81.3 |
| 16 | −172.273 | 0.10 | | | |
| 17 | 270.359 | 7.09 | $N_{10}$ 1.61800 | $\nu_{10}$ | 63.4 |
| 18 | −105.738 | 3.36 | $N_{11}$ 1.64769 | $\nu_{11}$ | 33.8 |
| 19 | −755.188 | 0.10 | | | |
| 20 | 144.780 | 3.68 | $N_{12}$ 1.69680 | $\nu_{12}$ | 55.5 |
| 21 | 445.920 | 2.64 | $N_{13}$ 1.74077 | $\nu_{13}$ | 27.8 |
| 22 | 200.000 | Variable | | | |
| 23 | −288.350 | 2.01 | $N_{14}$ 1.77250 | $\nu_{14}$ | 49.6 |
| 24 | 143.660 | 0.10 | | | |
| 25 | 101.000 | 4.10 | $N_{15}$ 1.59270 | $\nu_{15}$ | 35.3 |
| 26 | 868.000 | 70.28 | | | |
| 27 | 814.439 | 3.57 | $N_{16}$ 1.80518 | $\nu_{16}$ | 25.4 |
| 28 | ∞ | 43.07 | | | |
| 29 | 79.199 | 2.01 | $N_{17}$ 1.74077 | $\nu_{17}$ | 27.8 |
| 30 | 122.016 | 2.17 | $N_{18}$ 1.83481 | $\nu_{18}$ | 42.7 |
| 31 | 58.575 | | | | |

| Variable Distances | | | |
|---|---|---|---|
| f | 254.0 | 640.0 | 980.0 |
| $d_7$ | 1.83 | 134.31 | 232.82 |
| $d_{14}$ | 215.34 | 65.08 | 0.79 |
| $d_{22}$ | 21.06 | 38.85 | 4.62 |

$|f_2| = 148.41 = 0.58 f_W$
$f_0/f_{123} = 2.59$
$N_L = 1.77250$
$R_L = -288.350 = 1.91 f_4$

EXAMPLE 2

| | f = 137.0 ~ 588.0 | | $F_{NO}$ = 6.7 | | |
|---|---|---|---|---|---|
| | R | D | | | |
| 1 | 380.579 | 10.00 | $N_1$ 1.51728 | $\nu_1$ | 69.6 |
| 2 | −380.579 | 0.13 | | | |
| 3 | 210.000 | 9.70 | $N_2$ 1.49700 | $\nu_2$ | 81.3 |
| 4 | −370.000 | 1.47 | | | |
| 5 | −360.000 | 5.21 | $N_3$ 1.77250 | $\nu_3$ | 49.6 |
| 6 | 191.355 | 7.28 | $N_4$ 1.48749 | $\nu_4$ | 70.1 |
| 7 | ∞ | Variable | | | |
| 8 | 384.822 | 2.90 | $N_5$ 1.49700 | $\nu_5$ | 81.3 |
| 9 | 108.664 | 6.37 | | | |
| 10 | −170.124 | 2.80 | $N_6$ 1.61800 | $\nu_6$ | 63.4 |
| 11 | 2037.300 | 2.87 | | | |
| 12 | −131.719 | 2.89 | $N_7$ 1.71736 | $\nu_7$ | 29.5 |
| 13 | −57.789 | 2.79 | $N_8$ 1.61800 | $\nu_8$ | 63.4 |
| 14 | −624.975 | Variable | | | |
| 15 | ∞ | 4.70 | $N_9$ 1.61800 | $\nu_9$ | 63.4 |
| 16 | −115.170 | 0.10 | | | |
| 17 | 144.780 | 7.02 | $N_{10}$ 1.67000 | $\nu_{10}$ | 57.3 |
| 18 | −85.000 | 2.80 | $N_{11}$ 1.74077 | $\nu_{11}$ | 27.8 |
| 19 | −712.969 | 0.10 | | | |
| 20 | 76.282 | 4.79 | $N_{12}$ 1.61800 | $\nu_{12}$ | 63.4 |
| 21 | 448.000 | 2.68 | $N_{13}$ 1.60342 | $\nu_{13}$ | 38.0 |
| 22 | 93.000 | Variable | | | |
| 23 | −241.000 | 3.51 | $N_{14}$ 1.77250 | $\nu_{14}$ | 49.6 |
| 24 | 82.400 | 0.10 | | | |
| 25 | 58.481 | 3.48 | $N_{15}$ 1.68893 | $\nu_{15}$ | 31.1 |
| 26 | 149.326 | 62.64 | | | |
| 27 | 41.848 | 2.71 | $N_{16}$ 1.59951 | $\nu_{16}$ | 39.2 |
| 28 | 83.914 | 0.10 | | | |
| 29 | 54.300 | 1.91 | $N_{17}$ 1.80400 | $\nu_{17}$ | 46.6 |
| 30 | 32.583 | | | | |

| Variable Distances | | | |
|---|---|---|---|
| f | 137.0 | 400.0 | 588.0 |
| $d_7$ | 3.07 | 110.94 | 159.79 |
| $d_{14}$ | 159.89 | 40.57 | 1.69 |
| $d_{22}$ | 3.55 | 15.01 | 5.03 |

$f_2 = 99.38 = 0.73 f_W$
$f_0/f_{123} = 2.40$
$N_L = 1.7725$
$R_L = -241.0 = 1.76 f_4$

What is claimed is:

1. A compact super telephoto zoom lens comprising, in order from the object side, a first lens group having a positive refractive power, a second lens group having a negative refractive power, a third lens group having a positive refractive power and a fourth lens group having a negative refractive power, said second lens group being movable along the optical axis to thereby vary the focal length and said third lens group being movable along the optical axis to thereby maintain the image position constant, said fourth lens group being composed, in order, of a negative lens, a positive lens, at least one positive lens and at least one negative lens, said zoom lens satisfying:

| | f = 254.0~980.0 | | $F_{NO}$ = 10.0 | | |
|---|---|---|---|---|---|
| | R | D | | | |
| 1 | 500.000 | 7.09 | $N_1$ 1.49700 | $\nu_1$ | 81.3 |
| 2 | −646.382 | 0.22 | | | |
| 3 | 322.505 | 8.09 | $N_2$ 1.49700 | $\nu_2$ | 81.3 |
| 4 | −696.315 | 1.75 | | | |
| 5 | −680.500 | 4.28 | $N_3$ 1.74400 | $\nu_3$ | 44.7 |
| 6 | 360.000 | 5.81 | $N_4$ 1.56873 | $\nu_4$ | 63.2 |
| 7 | 1966.422 | Variable | | | |
| 8 | 605.547 | 2.65 | $N_5$ 1.49700 | $\nu_5$ | 81.3 |
| 9 | 174.750 | 3.55 | | | |
| 10 | −189.000 | 2.80 | $N_6$ 1.61800 | $\nu_6$ | 63.4 |
| 11 | ∞ | 2.39 | | | |
| 12 | −237.849 | 3.68 | $N_7$ 1.74077 | $\nu_7$ | 27.8 |
| 13 | −99.34 | 3.00 | $N_8$ 1.51821 | $\nu_8$ | 65.0 |
| 14 | 957.523 | Variable | | | |
| 15 | 816.500 | 4.91 | $N_9$ 1.49700 | $\nu_9$ | 81.3 |
| 16 | −172.273 | 0.10 | | | |
| 17 | 270.359 | 7.09 | $N_{10}$ 1.61800 | $\nu_{10}$ | 63.4 |
| 18 | −105.738 | 3.36 | $N_{11}$ 1.64769 | $\nu_{11}$ | 33.8 |
| 19 | −755.188 | 0.10 | | | |
| 20 | 144.780 | 3.68 | $N_{12}$ 1.69680 | $\nu_{12}$ | 55.5 |
| 21 | 445.920 | 2.64 | $N_{13}$ 1.74077 | $\nu_{13}$ | 27.8 |
| 22 | 200.000 | Variable | | | |
| 23 | −288.350 | 2.01 | $N_{14}$ 1.77250 | $\nu_{14}$ | 49.6 |
| 24 | 143.660 | 0.10 | | | |
| 25 | 101.000 | 4.10 | $N_{15}$ 1.59270 | $\nu_{15}$ | 35.3 |
| 26 | 868.000 | 70.28 | | | |
| 27 | 814.439 | 3.57 | $N_{16}$ 1.80518 | $\nu_{16}$ | 25.4 |
| 28 | ∞ | 43.07 | | | |
| 29 | 79.199 | 2.01 | $N_{17}$ 1.74077 | $\nu_{17}$ | 27.8 |
| 30 | 122.016 | 2.17 | $N_{18}$ 1.83481 | $\nu_{18}$ | 42.7 |
| 31 | 58.575 | | | | |

| Variable Distances | | | |
|---|---|---|---|
| f | 254.0 | 640.0 | 980.0 |
| $d_7$ | 1.83 | 134.31 | 232.82 |
| $d_{14}$ | 215.34 | 65.08 | 0.79 |

-continued

| | f = 254.0~980.0 | | $F_{NO} = 10.0$ |
|---|---|---|---|
| $d_{22}$ | 21.06 | 38.85 | 4.62 |

$|f_2| = 148.41 = 0.58\ f_W$
$f_0/f_{123} = 2.59$
$N_L = 1.77250$
$R_L = -288.350 = 1.91\ f_4$ where f is the focal length, R is the radius of curvature, D is the thickness on the optical axis or the spacings between lenses, N is the refractive index at the d-line, and $\nu$ is the Abbe number of the respective lens.

2. A compact super telephoto zoom lens comprising, in order from the object side, a first lens group having a positive refractive power, a second lens group having a negative refractive power, a third lens group having a positive refractive power and a fourth lens group having a negative refractive power, said second lens group being movable along the optical axis to thereby vary the focal length and said third lens group being movable along the optical axis to thereby maintain the image position constant, said fourth lens group being composed, in order, of a negative lens, a positive lens, at least one positive lens and at least one negative lens, said zoom lens satisfying:

| | f = 137.0 ~ 588.0 | | $F_{NO} = 6.7$ | | |
|---|---|---|---|---|---|
| | R | D | | | |
| 1 | 380.579 | 10.00 | $N_1$ | $\nu_1$ | 69.6 |
| 2 | −380.579 | 0.13 | | | |
| 3 | 210.000 | 9.70 | $N_2$ | $\nu_2$ | 81.3 |
| 4 | −370.000 | 1.47 | | | |
| 5 | −360.000 | 5.21 | $N_3$ | $\nu_3$ | 49.6 |
| 6 | 191.355 | 7.28 | $N_4$ | $\nu_4$ | 70.1 |
| 7 | ∞ | Variable | | | |
| 8 | 384.822 | 2.90 | $N_5$ | $\nu_5$ | 81.3 |
| 9 | 108.664 | 6.37 | | | |
| 10 | −170.124 | 2.80 | $N_6$ | $\nu_6$ | 63.4 |
| 11 | 2037.300 | 2.87 | | | |
| 12 | −131.719 | 2.89 | $N_7$ | $\nu_7$ | 29.5 |
| 13 | −57.789 | 2.79 | $N_8$ | $\nu_8$ | 63.4 |
| 14 | −624.975 | Variable | | | |
| 15 | ∞ | 4.70 | $N_9$ | $\nu_9$ | 63.4 |
| 16 | −115.170 | 0.10 | | | |
| 17 | 144.780 | 7.02 | $N_{10}$ | $\nu_{10}$ | 57.3 |
| 18 | −85.000 | 2.80 | $N_{11}$ | $\nu_{11}$ | 27.8 |
| 19 | −712.969 | 0.10 | | | |
| 20 | 76.282 | 4.79 | $N_{12}$ | $\nu_{12}$ | 63.4 |
| 21 | 448.000 | 2.68 | $N_{13}$ | $\nu_{13}$ | 38.0 |
| 22 | 93.000 | Variable | | | |
| 23 | −241.000 | 3.51 | $N_{14}$ | $\nu_{14}$ | 49.6 |
| 24 | 82.400 | 0.10 | | | |
| 25 | 58.481 | 3.48 | $N_{15}$ | $\nu_{15}$ | 31.1 |
| 26 | 149.326 | 62.64 | | | |
| 27 | 41.848 | 2.71 | $N_{16}$ | $\nu_{16}$ | 39.2 |
| 28 | 83.914 | 0.10 | | | |
| 29 | 54.300 | 1.91 | $N_{17}$ | $\nu_{17}$ | 46.6 |
| 30 | 32.583 | | | | |

| Variable Distances | | | |
|---|---|---|---|
| f | 137.0 | 400.0 | 588.0 |
| $d_7$ | 3.07 | 110.94 | 159.79 |
| $d_{14}$ | 159.89 | 40.57 | 1.69 |
| $d_{22}$ | 3.55 | 15.01 | 5.03 |

$f_2 = 99.38 = 0.73\ f_W$
$f_0/f_{123} = 2.40$
$N_L = 1.7725$
$R_L = -241.0 = 1.76\ f_4$ where f is the focal length, R is the radius of curvature, D is the thickness on the optical axis or the spacings between lenses, N is the refractive index at the d-line, and $\nu$ is the Abbe number of the respective lens.

* * * * *